(12) United States Patent
Liu (10) Patent No.: US 9,015,097 B2
(45) Date of Patent: Apr. 21, 2015

(54) SYSTEM AND METHOD FOR LEARNING ANSWERS TO FREQUENTLY ASKED QUESTIONS FROM A SEMI-STRUCTURED DATA SOURCE

(71) Applicant: Nuance Communications, Inc., Burlington, MA (US)

(72) Inventor: Ding Liu, Lowell, MA (US)

(73) Assignee: Nuance Communications, Inc., Burlington, MA (US)

( * ) Notice: Subject to any disclaimer, the term of this patent is extended or adjusted under 35 U.S.C. 154(b) by 267 days.

(21) Appl. No.: 13/720,437

(22) Filed: Dec. 19, 2012

(65) Prior Publication Data

US 2014/0172757 A1 Jun. 19, 2014

(51) Int. Cl.
*G06N 5/00* (2006.01)
*G06F 7/00* (2006.01)
*G06F 17/30* (2006.01)

(52) U.S. Cl.
CPC ................................ *G06F 17/30941* (2013.01)

(58) Field of Classification Search
None
See application file for complete search history.

(56) References Cited

U.S. PATENT DOCUMENTS

| | | | |
|---|---|---|---|
| 6,028,601 A | 2/2000 | Machiraju | |
| 6,327,590 B1 | 12/2001 | Chidlovskii et al. | |
| 6,766,320 B1 | 7/2004 | Wang et al. | |
| 7,284,004 B2 | 10/2007 | Cooper et al. | |
| 8,255,793 B2 * | 8/2012 | Chakrabarti et al. | 715/234 |
| 2002/0065845 A1 | 5/2002 | Naito et al. | |
| 2003/0028448 A1 | 2/2003 | Joseph et al. | |
| 2004/0111408 A1 | 6/2004 | Caudill et al. | |
| 2005/0076003 A1 | 4/2005 | DuBose et al. | |
| 2005/0080614 A1 * | 4/2005 | Bennett | 704/9 |
| 2006/0080107 A1 | 4/2006 | Hill et al. | |
| 2006/0100998 A1 | 5/2006 | Edwards | |
| 2006/0136455 A1 | 6/2006 | Wen et al. | |

(Continued)

FOREIGN PATENT DOCUMENTS

| | | |
|---|---|---|
| WO | WO 2008/051747 | 5/2008 |
| WO | WO 2011/126458 | 10/2011 |

OTHER PUBLICATIONS

Wen-Yun Yang, Yunbo Cao, Chin-Yew Lin, A Structural Support Vector Method for Extracting Contexts and Answers of Questions from Online Forums, Proceedings of the 2009 Conference on Empirical Methods in Natural Language Processing, pp. 514-523, Singapore, Aug. 6-7, 2009, http://aclweb.org/anthology-new/D/D09/D09-1054.pdf.

(Continued)

*Primary Examiner* — Alan Chen
(74) *Attorney, Agent, or Firm* — Hamilton, Brook, Smith & Reynolds, P.C.

(57) ABSTRACT

A frequently-asked-question (FAQ)-based system receives question(s) from a user and generates answer(s) based on data about the question(s). In one embodiment, a method includes retrieving, from a memory, a global structure and candidate answers therein. The method can include computing a first, second, and third probability of a candidate answer based on a local structure of the candidate answer within the global structure, content of the candidate answer given content of a query and context of the candidate answer given the content of the query, respectively. The method can include providing a combined probability of the candidate answer based on the first probability, second probability, and third probability. The method can improve efficiency of a FAQ-based system by automating organization of semi-structured data in a database. Therefore, a human user does not need to manually generate the database when it is already generated in semi-structured form, a semi-structured HTML document.

20 Claims, 10 Drawing Sheets

(56) References Cited

U.S. PATENT DOCUMENTS

| | | | |
|---|---|---|---|
| 2007/0124263 | A1 | 5/2007 | Katariya et al. |
| 2008/0281814 | A1 | 11/2008 | Calistri-Yeh et al. |
| 2008/0294584 | A1 | 11/2008 | Herz |
| 2009/0019026 | A1 | 1/2009 | Valdes-Perez et al. |
| 2009/0228264 | A1 | 9/2009 | Williams et al. |
| 2010/0030769 | A1 | 2/2010 | Cao et al. |
| 2010/0030770 | A1 | 2/2010 | Cao et al. |
| 2010/0094629 | A1* | 4/2010 | Emori et al. .......... 704/244 |
| 2011/0145333 | A1 | 6/2011 | Hind |
| 2011/0238408 | A1 | 9/2011 | Larcheveque et al. |
| 2011/0238409 | A1 | 9/2011 | Larcheveque et al. |
| 2011/0320442 | A1 | 12/2011 | Faruquie et al. |
| 2013/0007055 | A1* | 1/2013 | Brown et al. .......... 707/769 |
| 2013/0018876 | A1* | 1/2013 | Chu-Carroll et al. .......... 707/723 |
| 2013/0144890 | A1 | 6/2013 | Liu |
| 2013/0226906 | A1 | 8/2013 | Lebrun et al. |
| 2013/0288219 | A1* | 10/2013 | Dheap et al. .......... 434/350 |
| 2014/0006012 | A1* | 1/2014 | Zhou et al. .......... 704/9 |
| 2014/0280169 | A1 | 9/2014 | Liu |

OTHER PUBLICATIONS

Gao Cong, Long Wang, Chin-Yew Lin, Young-In Song, Yueheng Sun, Finding Question-Answer Pairs from Online Forums, SIGIR '08, Jul. 20-24, 2008, Singapore, http://courses.cs.byu.edu/~cs653ta/projs/rsh-papers/QA.pdf.

David Pinto, Michael Branstein, Ryan Coleman, W. Bruce Croft, Matthew King, Wei Li, Xing Wei, QuASM: A System for Question Answering Using Semi-Structured Data, JCDL '02, Jul. 13-17, 2002, Portland, Oregon, http://www.google.com/url?JCDL '02 Proceedings of the 2nd ACM/IEEE-CS joint conference on Digital libraries.

David Pinto, Andrew McCallum, Xing Wei, W. Bruce Croft, Table Extraction Using Conditional Random Fields, SIGIR 03, Jul. 28-Aug. 1, 2003, Toronto, Canada, http://people.cs.umass.edu/~mccallum/papers/crftable-sigir2003.pdf.

Xing Wei, Bruce Croft, Andrew McCallum, Table Extraction for Answer Retrieval, Information Retrieval Journal (IRJ), vol. 9, issue 5, pp. 589-611, Nov. 2006, http://people.cs.umass.edu/%7Emccallum/papers/TableExtraction-irj06.pdf.

Ashwini Pande, Table Understanding for Information Retrieval, Aug. 19, 2002, Blacksburg, VA, http://scholar.lib.vt.edu/theses/available/etd-08282002-151909/unrestricted/AshwiniPandeTableIR.pdf.

Xing Wei, Bruce Croft, Andrew McCallum, Nov. 2006, vol. 9, Issue 5, pp. 589-611, University of Amherst, Amherst, MA, http://people.cs.umass.edu/%7Emccallum/papers/TableExtraction-irj06.pdf.

European Search Report in Application No. 12 195 753.4, Entitled Method and Apparatus for Operating a Frequently Asked Questions (FAQ)-Based System, dated Apr. 22, 2013.

* cited by examiner

SYSTEM AND METHOD FOR LEARNING ANSWERS TO FREQUENTLY ASKED QUESTIONS FROM A SEMI-STRUCTURED DATA SOURCE

BACKGROUND OF THE INVENTION

Question Answering (QA) systems receive a query (e.g., a question) from a user, either in text or voice form, and provide an answer to the user. QA systems generally are configured to provide answers for common questions in a given topic area.

SUMMARY OF THE INVENTION

In one embodiment, a method can include retrieving, from a memory, a global structure and candidate answers therein. The method can include computing a first probability of a candidate answer based on a local structure of the candidate answer within the global structure. The method can also include computing a second probability of the candidate answer based on content of the candidate answer given content of a query. The method can additionally include computing a third probability of the candidate answer based on context of the candidate answer given the content of the query. The method can further include providing a combined probability of the candidate answer as a function of the first probability, second probability, and third probability.

In another embodiment, the method can include weighting the first probability with a first weight, the second probability with a second weight, and the third probability with a third weight. The first weight, second weight, and third weight can be based on tuning data. The tuning data can indicate a relative importance the first probability, the second probability, and third probability in providing the combined probability.

In a further embodiment, the method can include accepting training data representing locations of the local structure of the candidate answer within the global structure corresponding to a respective query.

In another embodiment, the method can also include determining the context of the candidate answer by walking through the global structure starting at the structure of the answer to other structures within the global structure.

In yet another embodiment, the method can include accepting structures of candidate answers allowable and non-allowable within the global structure.

In an even further embodiment, the method can include determining a frequency of features in the global structure. The method may further include representing the frequency of features determined in an answer prior model.

In another embodiment, the method can include determining a similarity of content of the candidate answer and the query. The method can further include representing the similarity in an answer likelihood model.

In an even further embodiment, the method can include determining a relationship of the candidate answer to other candidate answers within the candidate answers. The method can also include representing the relationship in the answer context model.

In one embodiment, retrieving the global structure from the memory can further include (a) automatically retrieving input data with a particular structure and (b) generating the global structure based on the input data by parsing the particular structure.

In another embodiment, the method can include returning a candidate answer of the plurality of candidate answers with a highest combined probability to provide to a device that submitted the query.

In one embodiment, a system can include a structure generation module configured to retrieve, from a memory, a global structure and a plurality of candidate answers therein. The system can also include a computation module. The computation module can include a first computation unit configured to compute a first probability of a candidate answer based on a local structure of the candidate answer within the global structure, a second computation unit configured to compute a second probability of the candidate answer based on content of the candidate answer given content of a query, and a third computation unit configured to compute a third probability of the candidate answer based on context of the candidate answer given the content of the query. The system can further include a combination module configured to provide a combined probability for the candidate answer as a function of the first probability, second probability, and third probability.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows. The teachings of all patents, published applications and references cited herein are incorporated by reference in their entirety.

In question answering (QA) systems, field data sources can be categorized into three types:

(1) structured data sources, which organize structured questions and answers in a database. No extra work is needed to extract the questions and answers;

(2) semi-structured data sources, which embed semi-structured questions and answers in the data of some structure, such as XML or HTML. Some extra computing, such as applying heuristic rules, needs to be performed to extract the questions and answers; or (3) un-structured data sources, which include text without any structure. Large amounts of computing, including passage retrieval, parsing, classification, etc., need be performed to extract answers.

Prodigy or FAQ applications are typical examples of using structured data. DeepQA or Watson by IBM™ are typical examples of using unstructured data. There is myriad data online embedded in HTML code, which is the most popular/common example of semi-structured data. Of course, not all HTML structured data can be categorized as semi-structured data. For example, if all an HTML document stores useful information in the bottom leaf node, then even though the page is structured using HTML, the information lacks structure or organization and is essentially the same as unstructured data. All of the information being within an organizational element, but being otherwise unorganized within that element, does not make the information semi-structured. Prior work has used data structures to extract questions/answers pairs to enhance QA applications based on heuristic rules, however, the rules are difficult to write and adapt to data sources of a different format. In one embodiment of the present invention, the presentation is a robust and effective data-driven method.

A web page can be organized by converting the HTML of the web page to a tree structure representation. For example, consider a web page that contains information about an application including what the application does, what the application does not do, and system requirements to install the application on different platforms. For example, the web page can answer the question "what is the system requirement for installing this application on my ipad2," with the answer "OS 3.2 or later." If the entire page is treated as a list of words, instead of as semi-structured data, this answer may not even be in the top list given the question because data on the web page unrelated to the system requirement makes it more difficult to find the correct answer without any guiding structure. Using the tree structure provides a clean path from a root node to a tree node (ignoring pure structural tree nodes):

"system requirement"→"ipad2"

Employing the tree structure of web pages helps both document retrieval and information extraction. An embodiment of the method proposed herein assumes the data source (e.g., each document in the data) is organized as a tree, and the answer is embedded in one or more consecutive tree nodes. If the tree node has children, the children are included too. Therefore, groups of answers can be allowable or non-allowable.

Under this assumption, to identify an answer, the system identifies the starting tree node and the ending tree node among its right siblings. For a page, there are at most N*M*M possible answers, where N denotes the number of tree nodes in a page, and M denotes the maximum number of children of a tree. For each candidate answer, its probability of being chosen is a product of two components:

$$P(a\text{-is-chosen})=p(a)p(a,d-a|q)$$

p(a) is an 'answer prior model' that represents the probability that a is an answer. For example, for the sequence of candidate tree nodes, if the sub-trees rooted at them are of the same structure, they are more likely to be an answer. This is described in more detail in relation to FIGS. 3A-C. p(a, d-a|q) denotes the probability that given query q, the document d can be used to extract the answer a. This probability can be further composed into:

$$p(a,d-a|q)=p(a|q)p(d-a|q)$$

p(a|q) an 'answer likelihood model' that represents a likelihood that a is an answer for query q. p(d-a|q) represents a likelihood that the rest of document provides enough evidence to answer query q. As described above, using the entire document can introduce noise to the model, so based on the tree structure, the scope can be narrowed based on the context close to the extracted answer a:

$$p(d-a|q)=p(\text{context}(a)|q)$$

This model is an 'answer context model.' To integrate all three components together (e.g., the answer prior model, the answer likelihood model, and the answer context model), the probability of choosing a candidate answer can be computed as the product of the three models:

$$P(a\text{-is-chosen})=p(a)^\alpha p(a|q)^\beta p(\text{context}(a)|q)^\theta$$

The three extra parameters (i.e., $\alpha$, $\beta$, $\theta$) are used to weigh the importance of the three models on the end probability. The weighing can either be performed manually or by using a statistical classifier (e.g., maxent). In one embodiment, the context model is more important than the answer model, which is more important than the answer likelihood model, and the weights can be adjusted to reflect the same, accordingly.

The implementation of a system under this framework therefore implements the three probability models. The rest of the application describes the models in detail with examples of implementations, although other implementations and embodiments are certainly possible.

Answer Prior Model

The answer prior model focuses on modeling the formation of the answer. For example, if the possible patterns for a valid answer is limited for one application, the system can count the frequency of each pattern in training data and answer prior model with a multinomial model. Generally, suppose the candidate answer is composed by $t_p, t_{p+1}, \ldots, t_q$, where $t_{p-1}$ and $t_{q+1}$ denote the tree node in the two boundaries. If $t_p$ is the first or $t_q$ is the last child of the parent tree node, then two dummy tree nodes represent the respective boundaries.

$$P(a) = \left(\prod_{i=p}^{q+1} p(t_i \mid t_{i-1})\right)^{\frac{1}{q-p+1}}$$

To model the transition probability, the system can employ a log linear model (or any statistical classifier that outputs probabilities), where multiple features can be used. For example, features can be:

Are $t_i$ and of the same shape?
Do $t_{i-1}$ and $t_i$ have the same depth?
Do $t_{i-1}$ and $t_i$ have the same number of children?
Do $t_{i-1}$ and $t_i$ have the same tag name? "<tr>", for example, is a tag name used in HTML to indicate a table row.
What is the tag name of the parent nodes of $t_{i-1}$ and $t_i$?
What is the tag name of $t_{i-1}$?
What is the tag name of $t_i$?

This log-linear model can then be trained based on the transition instances in the training data. Positive samples can be fewer than negative samples, and some data selection/balancing is necessary to generate a well-behaved model.

Answer Context Model

The context for a candidate answer is first defined to model context probability for a candidate answer $a=t_p, t_{p+1}, t_q$. The nodes $t_{p-1}$ and $t_{q+1}$ denote the tree node in the two boundaries.

If $t_p$ is the first or $t_q$ is the last child of the parent tree node, then two dummy tree nodes represent the boundaries, respectively. The context can be:

A parent of a;
A path from the root to the parent of a;
A first non-structural parent of a;
A first uncle of a;
Children of first uncle of a; and/or
$t_{p-1}$ and $t_{q+1}$.

For the candidate answer "OS 3.2 or later," its contexts are the nodes representing the answer, the rows of titles related to the answer, and parent nodes.

More specifically, the following features can be extracted based on the defined context (text similarity is treated as a set of functions to be defined):

Text similarity of q and the first non-structural parent of a;
Text similarity of q and the path from the root to the parent of a;
Text similarity of q and the first uncle of a;
Text similarity of q and the children of a's first uncle;
Text similarity of q and the pth to the qth children of a's first uncle;
Text similarity of q and $t_{p-1}$; and/or
Text similarity of q and $t_{q+1}$.

With these features, a log-linear model can then be trained. Heuristics define the features and also work for applications of different data format. Also, the scope of the context can be gradually expanded until better results cannot be achieved.

Answer Likelihood Model

The answer likelihood model captures similarity between content of a candidate answer a and a given query q. It can be similarly modeled as the answer prior model, with a different set of features:

KL-divergence of q and a,
KL-divergence of a and q, and
Number of 2 gram/3 gram/4 gram/5 gram appearing in both a and q/number of total 2 gram/3 gram/4 gram/5 gram in a.

While in some cases, the query and answer may not overlap, when it does overlap, the answer likelihood model is helpful.

Figure 1:
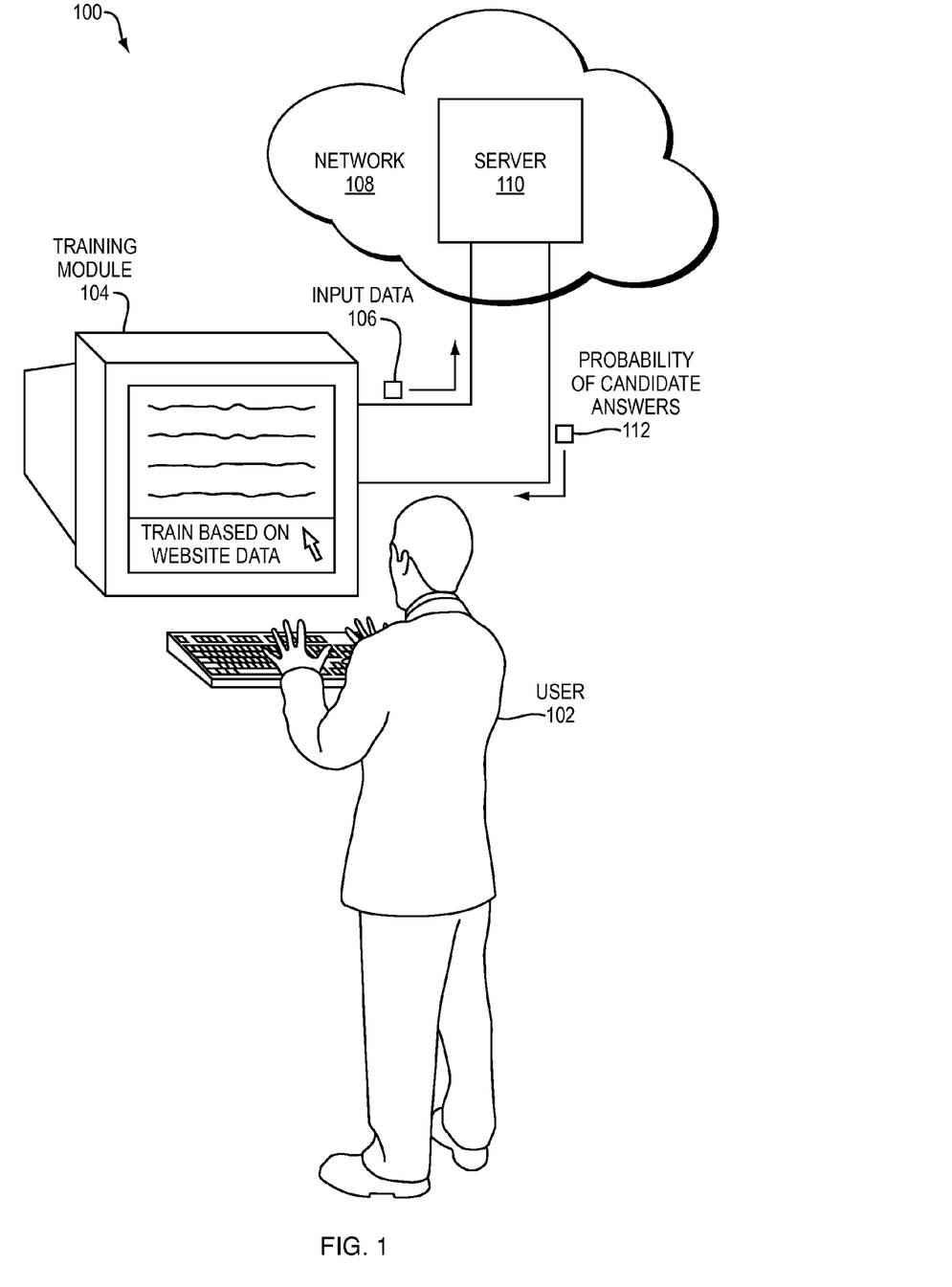
FIG. 1 is a block diagram illustrating an example embodiment of the present invention.

FIG. 1 is a block diagram 100 illustrating an example embodiment of the present invention. A user 102 employs a training module 104 (e.g., a computer, other computing device, or input device) to train an FAQ-based system (not shown) based on semi-structured data. In one embodiment, the user's 102 can use data from a website, webpage, as the semi-structured data. Upon the user 102 loading the semi-structured data on the training module 104, the user can select to train an FAQ-based system based on the semi-structured data. The training module 104 sends input data 106 to a server 110 in a network 108. The server 110 uses the input data 106 to determine a probability of candidate answers 112. The probability of candidate answers 112 is returned to the training module 104. The probability 112 is used to train the FAQ-based system within the training module.

The FAQ-based system can be stored either on the training module 104 or on the server 110. In addition, the training based on the input data can be performed locally on the training module 104, instead of on the server 110 over the network 108.

Figure 2:
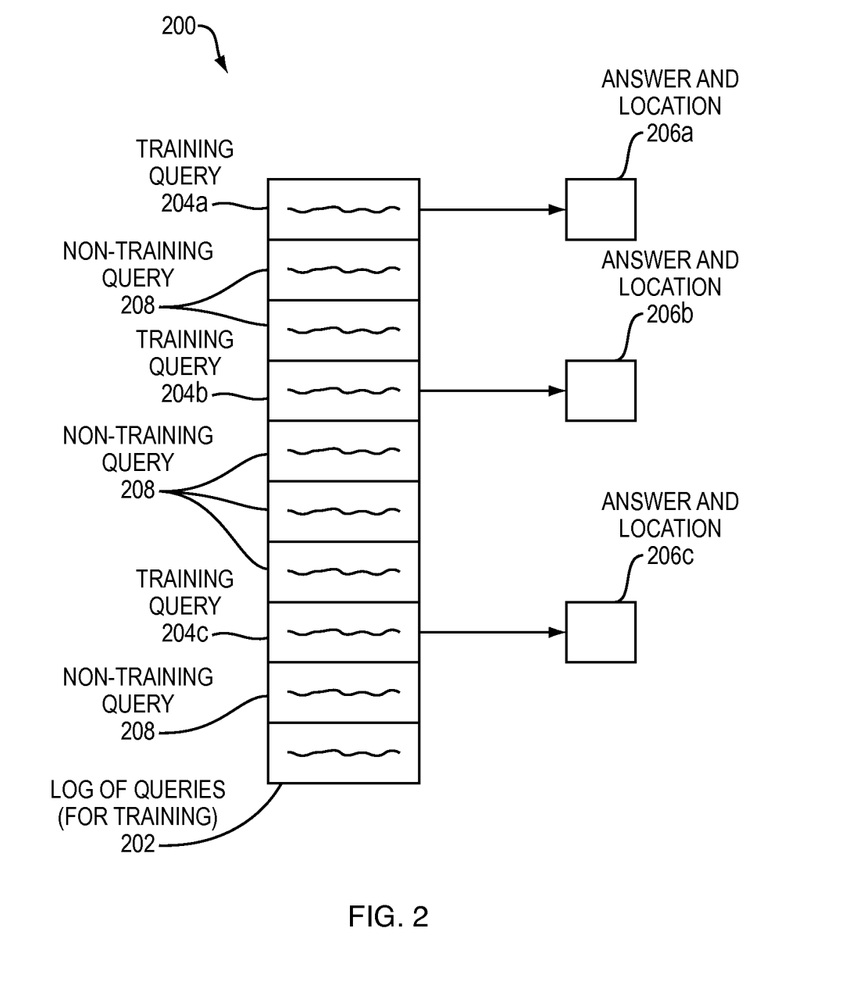
FIG. 2 is a diagram illustrating an example embodiment of mapping queries to answers.

FIG. 2 is a diagram 200 illustrating an example embodiment of a method of mapping queries to answers. A log of queries 202 (for training) includes both training queries 204a-c and non-training queries 208. The training queries 204a-c and non-training queries 208 each represent a logged question from a previous use of an FAQ-based system or from a set of training data. Out of the set of training queries 204a-c and non-training queries 208, selected queries are mapped to an answer and location 206a-c. In this example, training query 204a-c are mapped to an answer and location 206a-c. Training query 204a is mapped to an answer and location 206a, training query 204b is mapped to answer and location 206b, and training query 204c is mapped to answer and location 206c. The location of the answer and location 206a-c can represent the location in the data structure (e.g., the semi-structured data or the global structure).

Figure 3A:
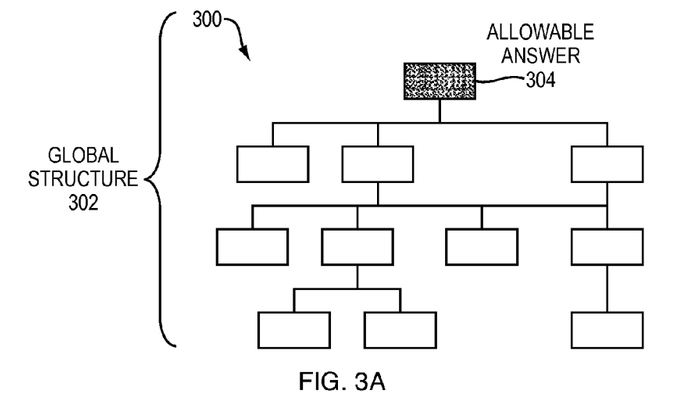
FIGS. 3A-C are diagrams illustrating example embodiments of a global structure highlighting allowable answers.

FIG. 3A is a diagram 300 illustrating an example embodiment of a global structure 302 highlighting an allowable answer 304. The global structure 302, as described herein, is a representation of the semi-structured data inputted into the system. The global structure 302 includes a plurality of nodes, starting from a root node. The global structure 302 can have sets of allowable answers represented in its nodes. A set of allowable answers can be determined by the structure of the global structure 302 (e.g., the physical location of each nodes relative to each other) by employing the answer prior model. Likewise, the global structure 302 can include non-allowable answers that are identified by the structure of the global structure 302.

In relation to FIG. 3A, an example of the allowable answer 304 is the root node of the global structure 302. The root node or allowable answer 304 is allowable because it is the root node. The root node is an allowable group because the group has no other nodes to make the combination be non-allowable.

Figure 3B:
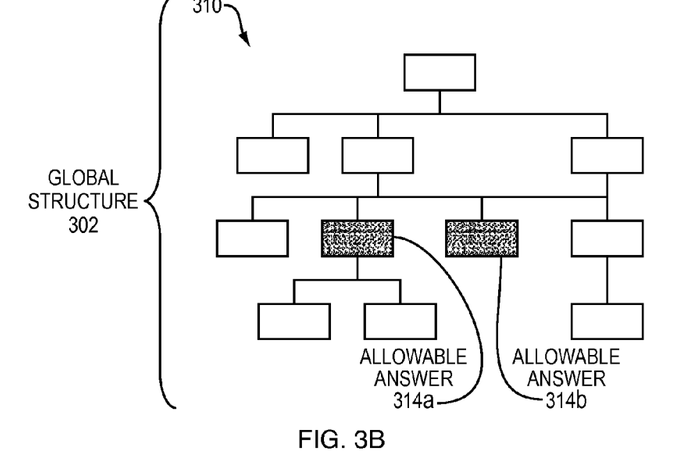

FIG. 3B is a diagram 310 illustrating an example embodiment of the global structure 302 highlighting allowable answers 314a and 314b. Allowable answers 314a and 314b are an allowable group because they are brother and sister nodes. This means that the nodes are on the same level of the global structure 302, and also not removed from one another within that level. They also share the same parent node.

Figure 3C:
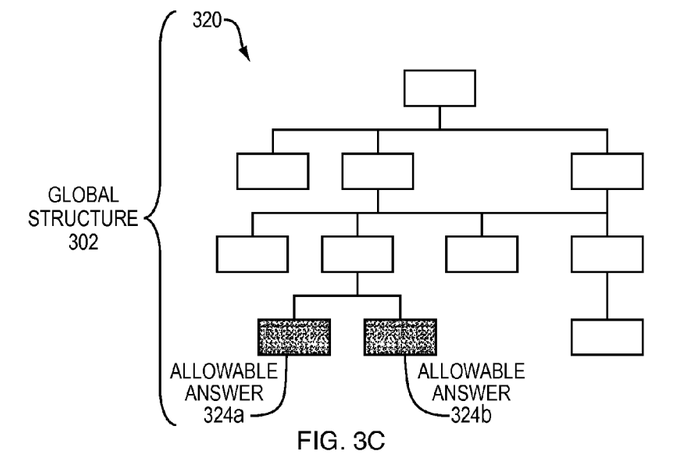

FIG. 3C is a diagram 320 illustrating an example embodiment of the global structure 302 highlighting allowable answers 324a and 324b. Allowable answers 324a and 324b, like allowable answers 314a and 314b, are allowable because they are brother and sister nodes sharing the same parent.

Figure 4A:
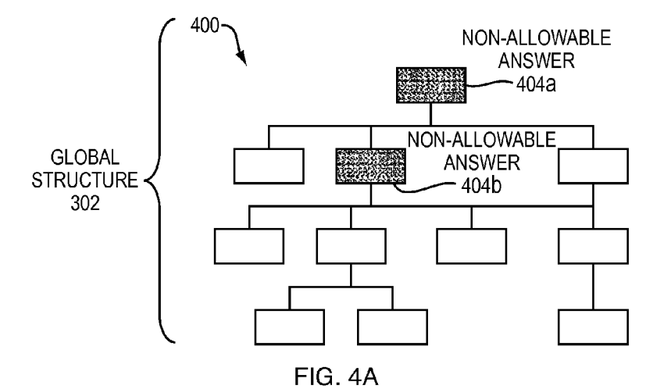
FIGS. 4A-C are diagrams illustrating example embodiments of a global structure highlighting non-allowable answers.

FIG. 4A is a diagram 400 illustrating an example embodiment of a global structure 302 highlighting non-allowable answers 404a and 404b. A non-allowable group of answers is based on context of the group of answers. For example, the non-allowable answers 404a and 404b are non-allowable together as a group because one is a parent node to the other. A parental relationship among the nodes drastically reduces the likelihood that the nodes are both candidate answers to a given query. Therefore, non-allowable answers 404a and 404b are not likely to both be candidate answers to the same query.

Figure 4B:
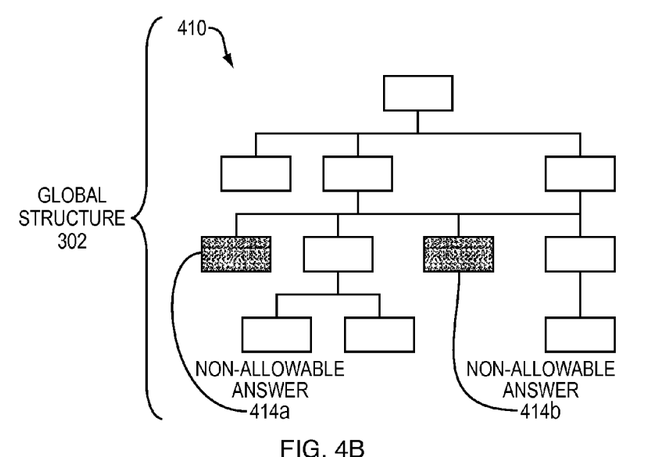

FIG. 4B is a diagram 410 illustrating an example embodiment of the global structure 302 highlighting another example of non-allowable answers 414a and 414b. The non-allowable answers 414a and 414b are unallowable because, even though they share a parent, they are far removed from each other along their particular level. An intervening node is between the non-allowable answers 414a and 414b. This is an example of a configuration of a non-allowable answer model.

However, depending on the source of the structured data and the format of the global structure 302, in one embodiment, the non-allowable answer groups may not depend on their location within a given sibling level. In other words, in another embodiment, non-allowable answers 414a and 414b may instead be allowable.

Figure 4C:
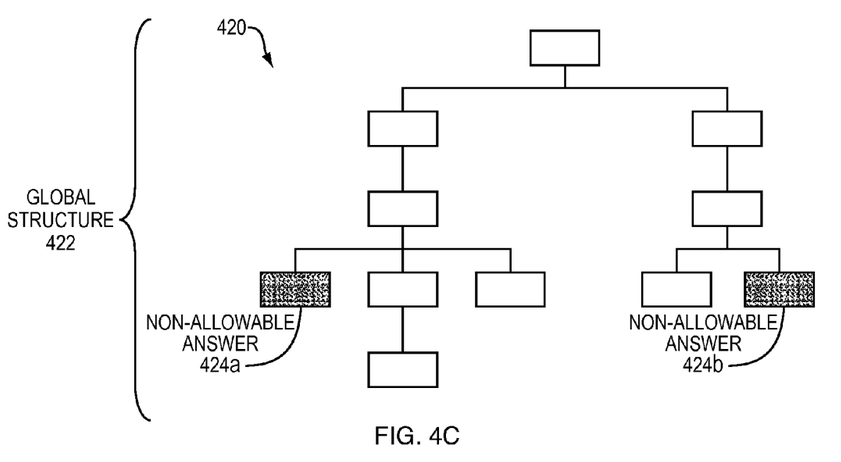

FIG. 4C is a diagram 420 illustrating an example embodiment of global structure 422 highlighting non-allowable answers 424a and 424b within. Non-allowable answers 424a and 424b are non-allowable because they are on separate sides of the tree of the global structure 422. The global structure 422 has a root node with two child nodes, each of whom has their own child node(s). From there, the non-allowable answer 424a is a child of the first grandchild of the root node, where non-allowable answer 424b is a child of the second grandchild of the root node. While the non-allowable answers 424a and 424b are on the same vertical distance from the root node, they have different parents and grandparents nodes, and, therefore, are non-allowable as a group.

Figure 5:
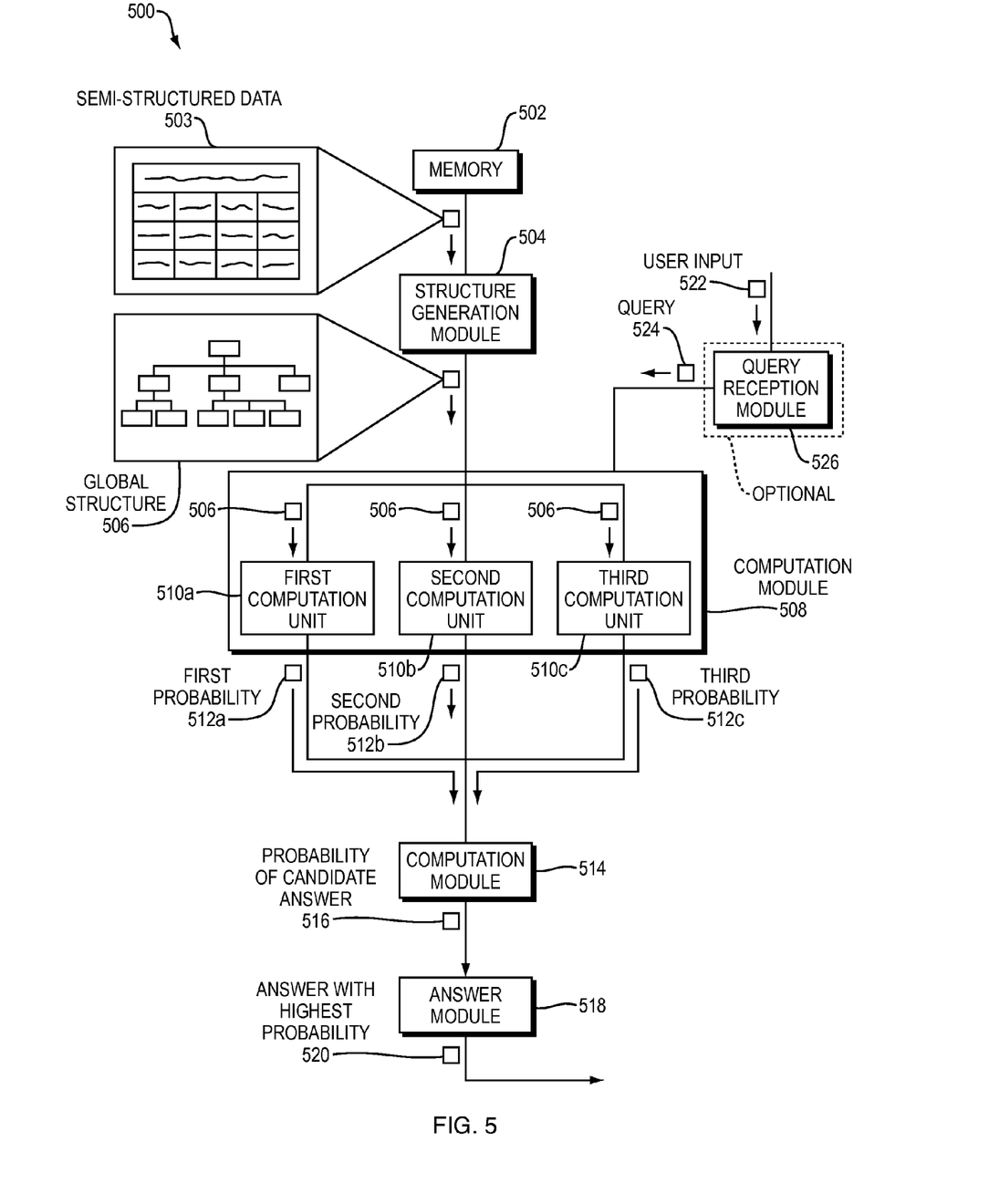
FIG. 5 is a block diagram illustrating an example embodiment of the present invention.

FIG. 5 is a block diagram illustrating an example embodiment of a system 500 of the present invention. The system 500 includes a memory 502 which can store semi-structured data 503. A structure generation module 504 loads the semi-structured data 503. The structure generation module 504, based on the semi-structured data 503, generates a global structure 506 (e.g., global structure 302 or global structure 422). The structure generation module 504 sends the global structure 506 to a computation module 508. Within the computation module 508 are a first computation unit 510a, a second computation unit 510b, and a third computation unit 510c. Each respective computation unit 510a-c loads the global structure 506. The first computation unit 510 generates a first probability 512a which is based on a local structure of the candidate answer within the global structure of the plurality of candidate answers. The second probability is based on contents of the candidate answer given the query 524 (which is supplied to the computation module 506). The third probability 512c is based on the context of the candidate answer based on the query. Then, a computation module 514 generates a probability of the candidate answer 516. The probability of the candidate answer 516 is based on a combination of the first probably 512a, second probability 512b, and third probably 512c. The computation of module 514a can weigh each probability 512a-c based on training data, or other user preferences in weighing each probability. Then, an answer module 518 receives the probability of the candidate answer 516 and returns an answer with a highest probability 520.

In one embodiment, the system 500 also includes a query reception module 526. The query reception module receives user input 522, which can be training data or a user query. The query reception module then forwards the query 524 to the computation module 506.

Figure 6:
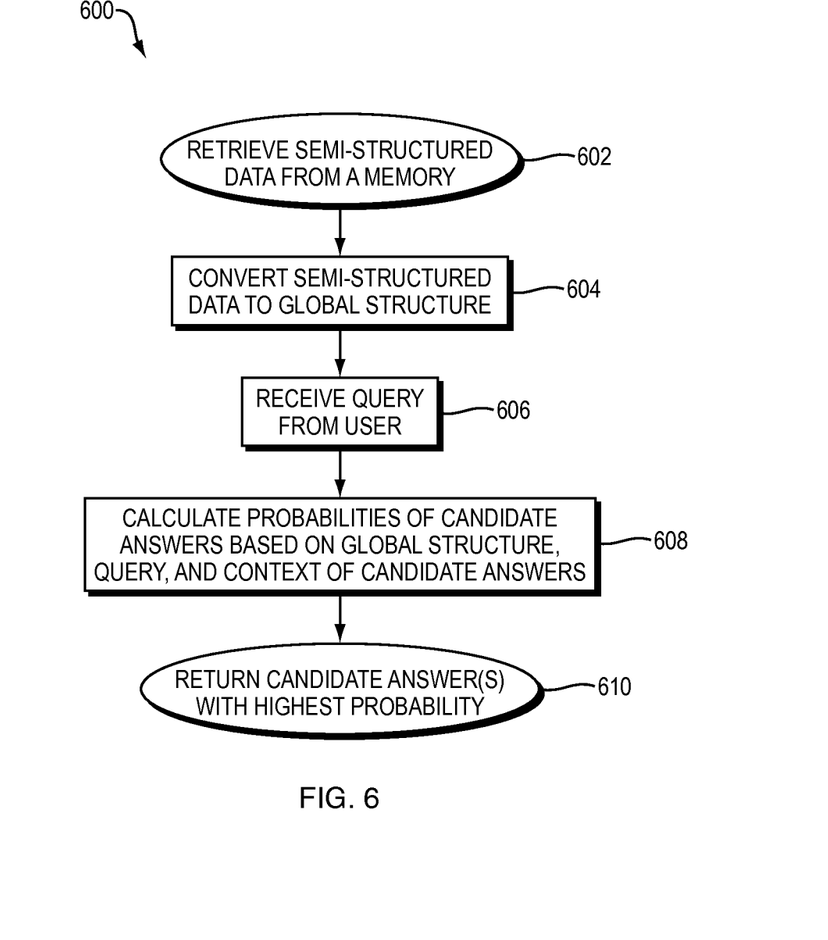
FIG. 6 is a flow diagram illustrating an example process employed by an example embodiment of the present invention.

FIG. 6 is a flow diagram 600 illustrating an example process employed by an example embodiment of the present invention. First, the system retrieves semi-structured data from a memory (602). Then, the system converts semi-structured data to a global structure (604). Then, the system receives a query from the user (606). Then, the system calculates probabilities of candidate answers based on global structure, the query, and context of the candidate answers (608). Then, the system returns candidate answers with a highest probability (610).

Figure 7:
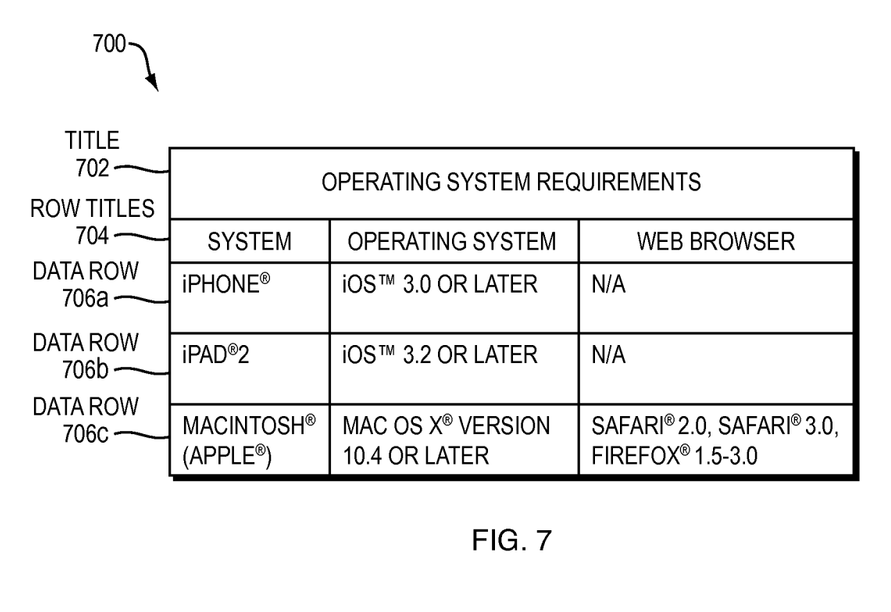
FIG. 7 is a diagram illustrating an example embodiment of semi-structured data.

FIG. 7 is a diagram illustrating an example embodiment of semi-structured data. In this example, the semi-structured data is presented to the user as a table 700. The table 700 includes a title 702 (reading "operating system requirements"). The table 700 further includes row titles 704 (e.g., "system," "operating system," and "web browser"). The table 700 further includes a plurality of data rows 706a-c. Data row 706a includes an "iPhone®" under system, "iOS™ 3.0 or later" under operating system, and "N/A" under web browser. Data row 706b includes "iPad® 2" under system, "iOS™ 2.2 or later" under operating system, and "N/A" under web browser. Data row 706c includes "Macintosh® (Apple®)" under system, "Mac OS X® version 10.4 or later" under operating system, and "Safari® 2.0, Safari® 3.0, or Firefox® 1.5 to 3.0" under web browser.

Figure 8:
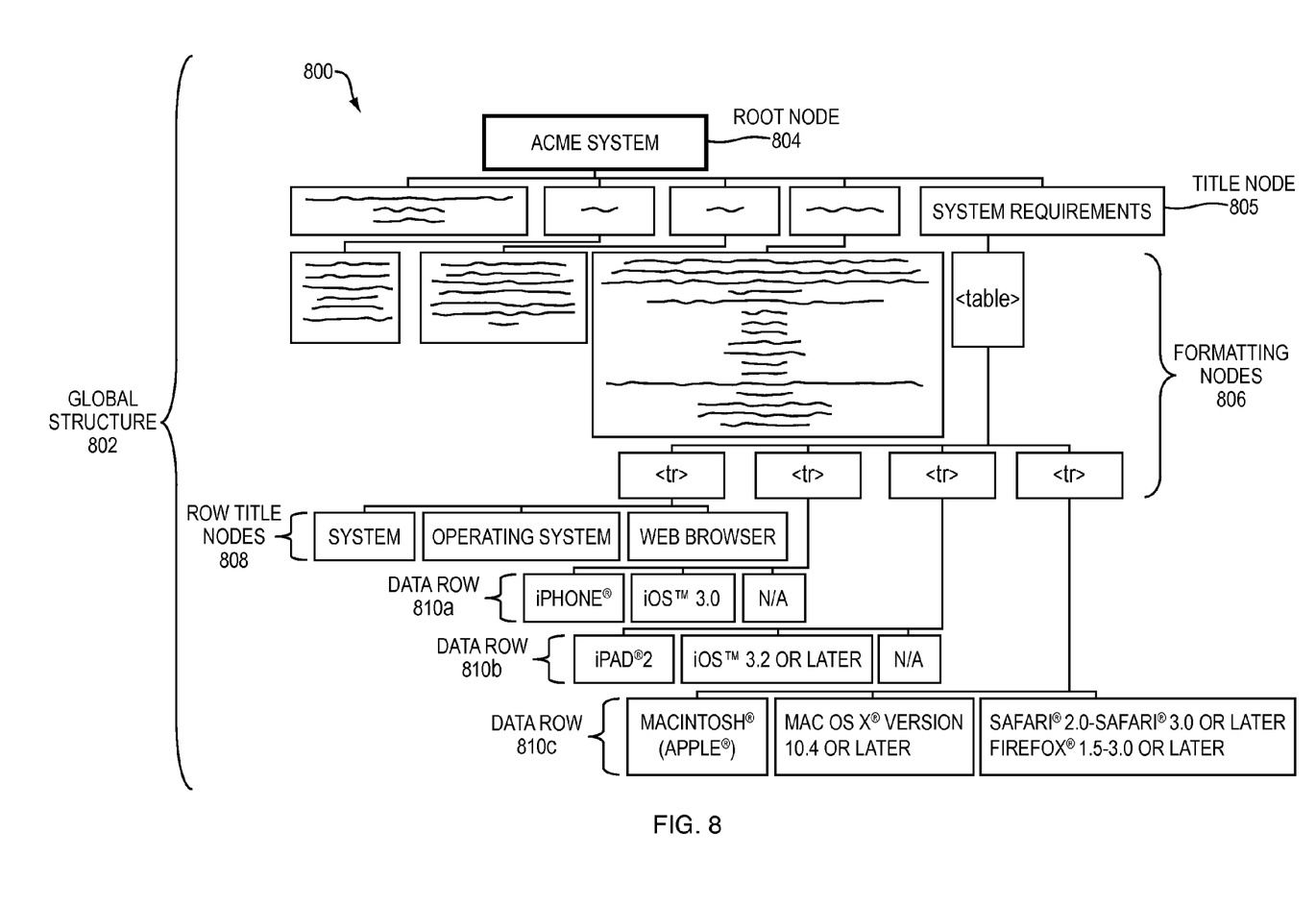
FIG. 8 is a diagram illustrating a global structure of the table illustrated in FIG. 7.

FIG. 8 is a diagram 800 illustrating a global structure 802 of the table 700 illustrated in FIG. 7. In relation to FIG. 8, the global structure 802 includes a root node 804, with a title node 805. The title node 805 is a parent to a plurality of formatting nodes 806. The formatting nodes 806 configure the format for the table. Each of the formatting nodes either initiates the table, or initiates a row of the table. Within each row of the table are row title nodes 808, and arrows 810a-c, respectively. The row title nodes 808 are shown as row titles 704 in FIG. 7, whereas the data rows 810a-c are shown as the data rows 706a-c in FIG. 7.

Figure 9:
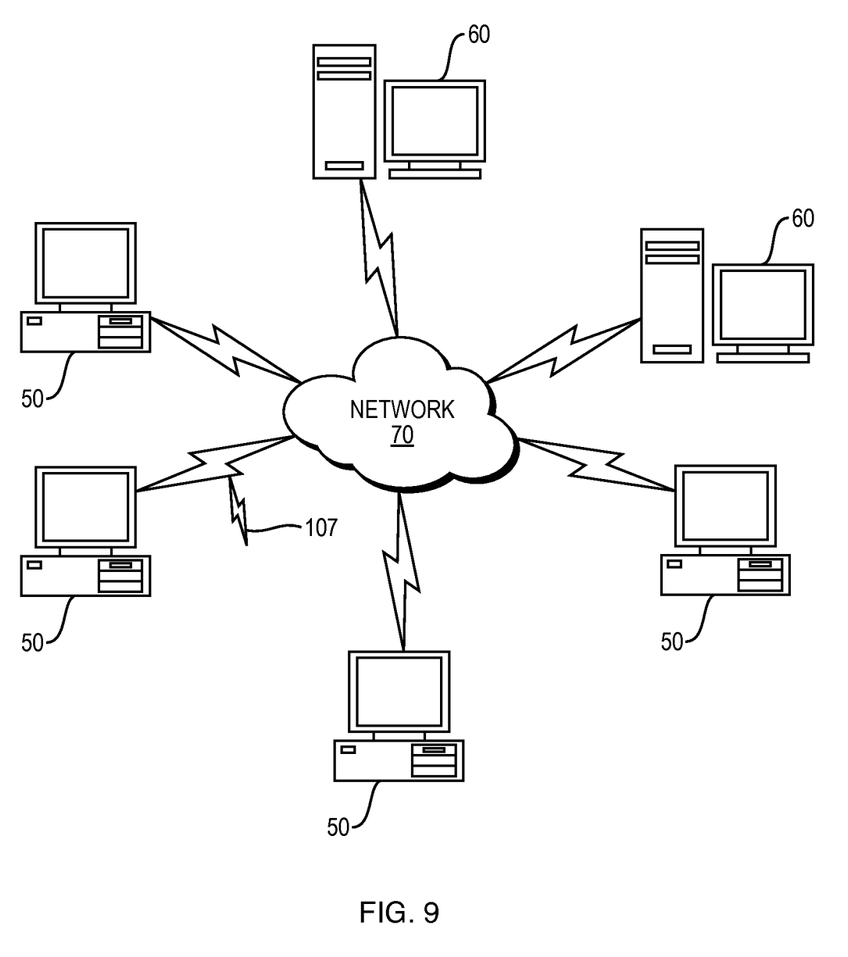
FIG. 9 illustrates a computer network or similar digital processing environment in which the present invention may be implemented.

FIG. 9 illustrates a computer network or similar digital processing environment in which embodiments of the present invention may be implemented.

Client computer(s)/devices 50 and server computer(s) 60 provide processing, storage, and input/output devices executing application programs and the like. The client computer(s)/devices 50 can also be linked through communications network 70 to other computing devices, including other client devices/processes 50 and server computer(s) 60. The communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 10:
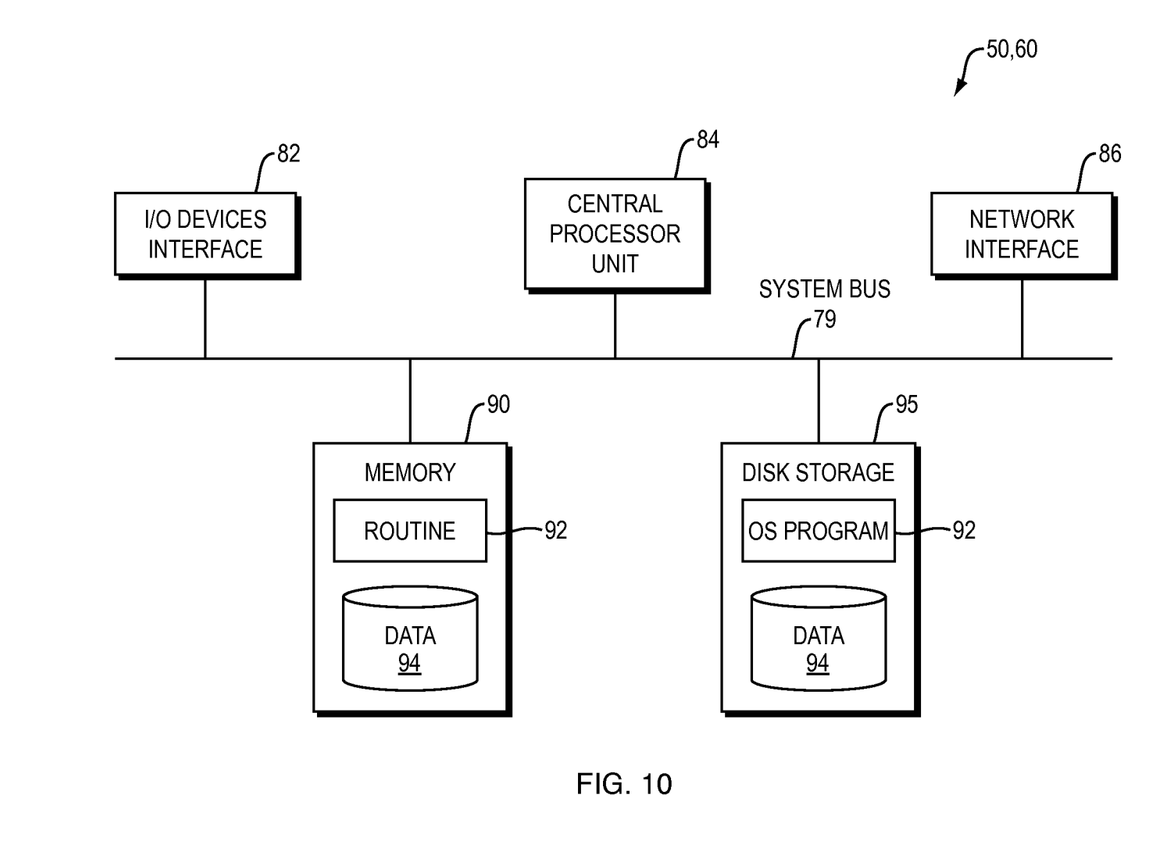
FIG. 10 is a diagram of the internal structure of a computer (e.g., client processor/device 50 or server computers 60) in the computer system of FIG. 9.

FIG. 10 is a diagram of an example internal structure of a computer (e.g., client processor/device 50 or server computers 60) in the computer system of FIG. 9. Each computer 50, 60 contains a system bus 79, where a bus is a set of hardware lines used for data transfer among the components of a computer or processing system. The system bus 79 is essentially a shared conduit that connects different elements of a computer system (e.g., processor, disk storage, memory, input/output ports, network ports, etc.) that enables the transfer of information between the elements. Attached to the system bus 79 is an I/O device interface 82 for connecting various input and output devices (e.g., keyboard, mouse, displays, printers, speakers, etc.) to the computer 50, 60. A network interface 86 allows the computer to connect to various other devices attached to a network (e.g., network 70 of FIG. 9). Memory 90 provides volatile storage for computer software instructions 92 and data 94 used to implement an embodiment of the present invention (e.g., structure generation module, computation module, and combination module code detailed above). Disk storage 95 provides non-volatile storage for computer software instructions 92 and data 94 used to implement an embodiment of the present invention. A central processor unit 84 is also attached to the system bus 79 and provides for the execution of computer instructions.

In one embodiment, the processor routines 92 and data 94 are a computer program product (generally referenced 92), including a computer-readable medium (e.g., a removable storage medium such as one or more DVD-ROM's, CD-ROM's, diskettes, tapes, etc.) that provides at least a portion of the software instructions for the invention system. The computer program product 92 can be installed by any suitable software installation procedure, as is well known in the art. In another embodiment, at least a portion of the software instructions may also be downloaded over a cable communication and/or wireless connection. In other embodiments, the invention programs are a computer program propagated signal product embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternative embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer-readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   retrieving, from a memory, a global structure and a plurality of candidate answers therein;
   computing a first probability of a candidate answer based on a local structure of the candidate answer within the global structure;
   computing a second probability of the candidate answer based on content of the candidate answer given content of a query;
   computing a third probability of the candidate answer based on context of the candidate answer given the content of the query; and
   providing a combined probability of the candidate answer as a function of the first probability, second probability, and third probability.

2. The method of claim 1, further comprising weighting the first probability with a first weight, the second probability with a second weight, and the third probability with a third weight, the first weight, second weight, and third weight based on tuning data, the tuning data indicating a relative importance the first probability, the second probability, and third probability in providing the combined probability.

3. The method of claim 1, further comprising accepting training data representing locations of the local structure of the candidate answer within the global structure corresponding to a respective query.

4. The method of claim 1, further comprising determining the context of the candidate answer by walking through the global structure starting at the structure of the answer to other structures within the global structure.

5. The method of claim 1, further comprising accepting structures of candidate answers allowable and non-allowable within the global structure.

6. The method of claim 1, further comprising:
   determining a frequency of features in the global structure; and
   representing the frequency of features determined in an answer prior model.

7. The method of claim 1, further comprising:
   determining a similarity of content of the candidate answer and the query; and
   representing the similarity in an answer likelihood model.

8. The method of claim 1, further comprising:
   determining a relationship of the candidate answer to other candidate answers within the plurality of candidate answers; and
   representing the relationship in the answer context model.

9. The method of claim 1, wherein retrieving the global structure from the memory further includes automatically retrieving input data with a particular structure and generating the global structure based on the input data by parsing the particular structure.

10. The method of claim 1, further comprising returning a candidate answer of the plurality of candidate answers with a highest combined probability to provide to a device that submitted the query.

11. A system comprising:
   a processor; and
   a non-transitory computer-readable medium having encoded thereon a sequence of instructions which, when loaded and executed by the processor, causes the processor to implement:
      a structure generation module configured to retrieve, from a memory, a global structure and a plurality of candidate answers therein;
      a computation module including: (i) a first computation unit configured to compute a first probability of a candidate answer based on a local structure of the candidate answer within the global structure; (ii) a second computation unit configured to compute a second probability of the candidate answer based on content of the candidate answer given content of a query; and (iii) a third computation unit configured to compute a third probability of the candidate answer based on context of the candidate answer given the content of the query; and
      a combination module configured to provide a combined probability for the candidate answer as a function of the first probability, second probability, and third probability.

12. The system of claim 11, wherein the sequence of instructions which, when loaded and executed by the processor, further causes the processor to implement a weighting module configured to weight the first probability with a first weight, the second probability with a second weight, and the third probability with a third weight, the first weight, second weight, and third weight based on tuning data, the tuning data indicating a relative importance the first probability, the second probability, and third probability in providing the combined probability.

13. The system of claim 11, wherein the sequence of instructions which, when loaded and executed by the processor, further causes the processor to implement a training module configured to accept training data representing locations of the local structure of the candidate answer within the global structure corresponding to a respective query.

14. The system of claim 11, wherein the sequence of instructions which, when loaded and executed by the processor, further causes the processor to implement a tree walk module configured to determine the context of the candidate answer context by walking through the global structure starting at the structure of the answer to other structures within the global structure.

15. The system of claim 11, wherein the sequence of instructions which, when loaded and executed by the processor, further causes the processor to implement a filter module configured to accept structures of candidate answers allowable and non-allowable within the global structure.

16. The system of claim 11, wherein the computation module is further configured to:
   determine a frequency of features in the global structure; and
   represent the frequency of features determined in an answer prior model.

17. The system of claim 11, wherein the computation module is further configured to:
   determine a similarity of content of the candidate answer and the query; and
   represent the similarity in an answer likelihood model.

18. The system of claim 11, wherein the computation module is further configured to:
   determine a relationship of the candidate answer to other candidate answers within the plurality of candidate answers; and
   represent the relationship in an answer context model.

19. The system of claim 11, wherein the structure generation module is further configured retrieve input data with a particular structure and generating the global structure automatically based on the input data by parsing the particular structure.

20. The system of claim 11, wherein the sequence of instructions which, when loaded and executed by the processor, further causes the processor to implement an answer module configured to return a candidate answer of the plurality of candidate answers with a highest combined probability to provide to a device that submitted the query.

* * * * *